Figure 1:
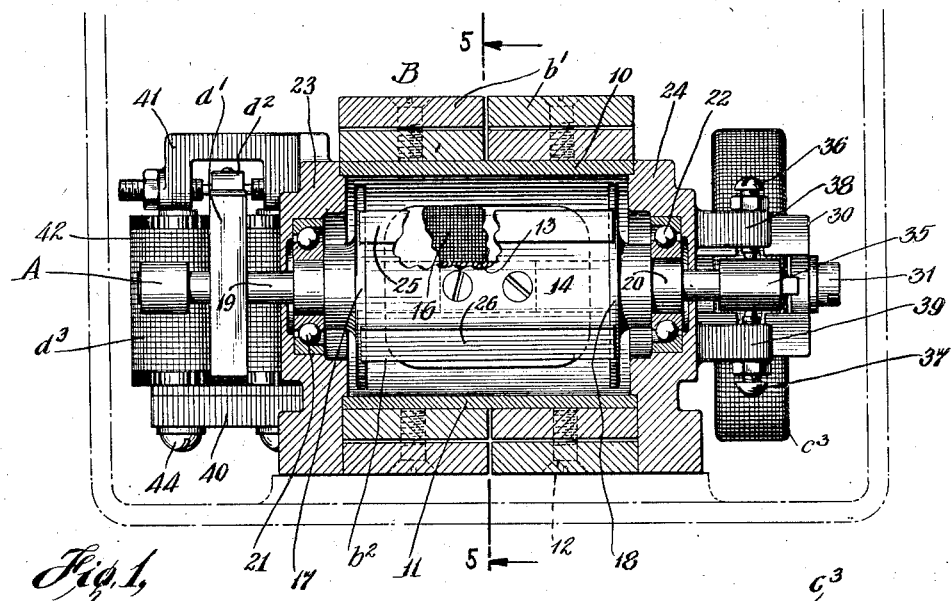

Feb. 24, 1925.

T. BODDE 1,527,465

INDICATION SELECTOR FOR TRAIN CONTROL SYSTEMS

Filed April 23, 1923     2 Sheets-Sheet 1

INVENTOR
Theodore Bodde
BY Meyers & Cavanagh
ATTORNEYS

Feb. 24, 1925.
T. BODDE
1,527,465
INDICATION SELECTOR FOR TRAIN CONTROL SYSTEMS
Filed April 23, 1923  2 Sheets-Sheet 2
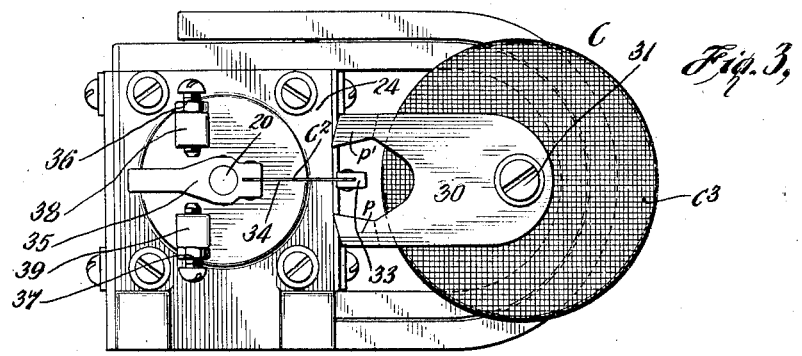
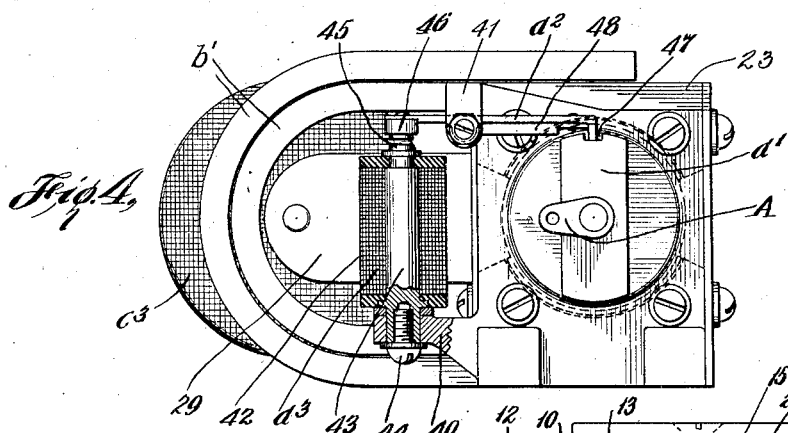
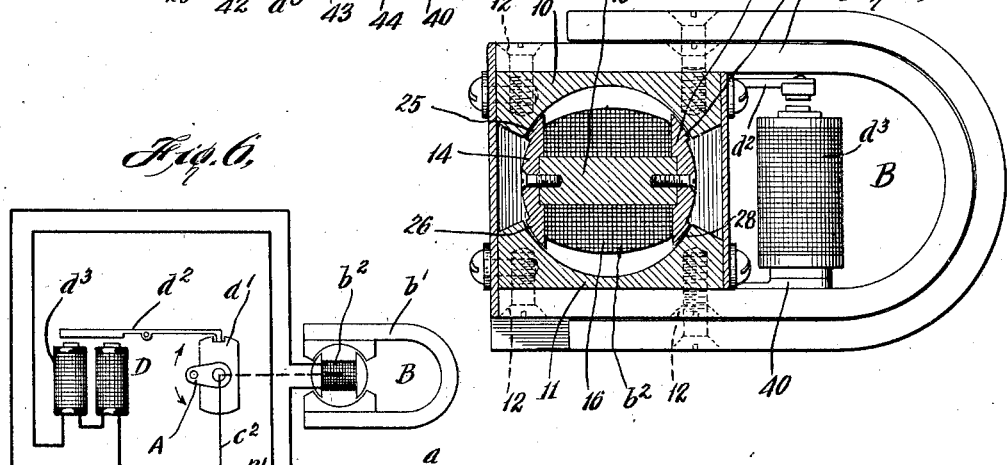
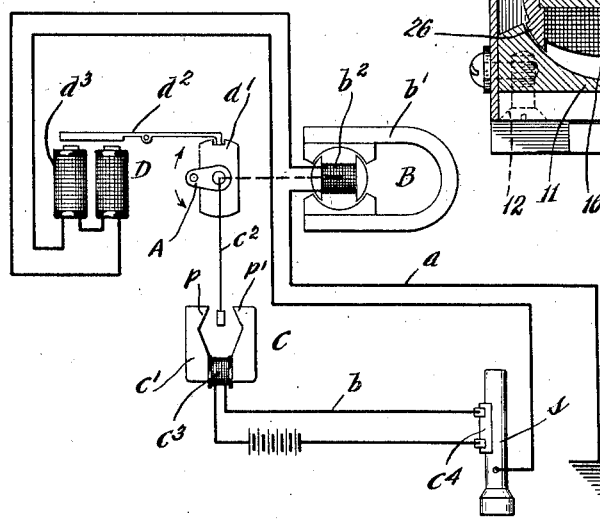
INVENTOR
Theodore Bodde
BY Meyers & Cavanagh
ATTORNEYS Patented Feb. 24, 1925.

1,527,465

UNITED STATES PATENT OFFICE.

THEODORE BODDE, OF NIAGARA FALLS, NEW YORK, ASSIGNOR TO THE REGAN SAFETY DEVICES COMPANY, INC., OF NEW YORK, N. Y., A CORPORATION OF NEW YORK.

INDICATION SELECTOR FOR TRAIN-CONTROL SYSTEMS.

Application filed April 23, 1923. Serial No. 634,059.

*To all whom it may concern:*

Be it known that I, THEODORE BODDE, a citizen of the United States, and resident of Niagara Falls, in the county of Niagara and State of New York, have invented certain new and useful Improvements in Indication Selectors for Train-Control Systems, of which the following is a specification.

This invention relates to train control apparatus, and more particularly to an apparatus selectively operable in response to traffic or roadside conditions for producing indications on a vehicle corresponding to the traffic conditions; and has special reference to the provision of an indication selector capable of being operated intermittently from the roadside for producing any one of a number of different indications.

The principal objects of my present invention may be said to include the provision of an indication selector especially adapted to be employed in connection with the intermittent, such as the ramp or contact type of train control systems, and adapted to be operated intermittently when a shoe carried by the vehicle engages a roadside ramp; the further provision of an indication selector in which is provided an indication means selectively movable into any one of a plurality of active positions when the shoe engages the ramp, combined with a magnetic clutch means for holding the indication means in the position to which it has been selectively moved; the further provision of an indication selector of the kind referred to in which an inertialess magnetic clutch means is provided, the said means being constructed to be instantly operable to perform its holding function after the indicator has been moved to an active position; the still further provision of an indication selector in which the indicating means is also movable into an inactive or neutral position, and is magnetically influenced to assume such position; and the provision of an indication selector of this nature provided with means for locking the indication means in its neutral or inactive position.

Figure 2:
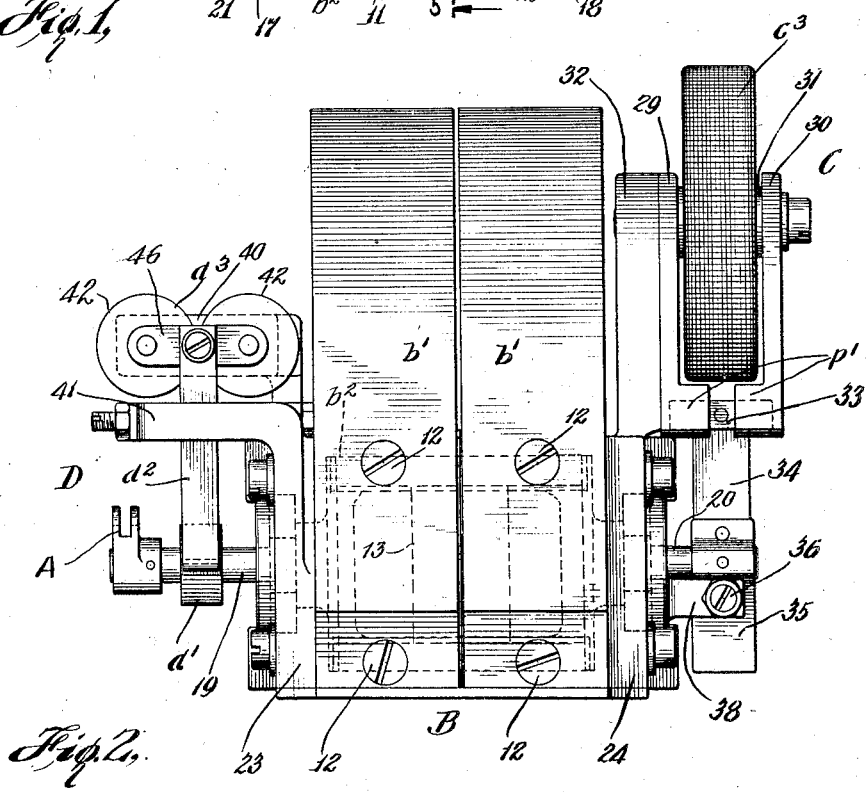

To the accomplishment of the foregoing and such other objects as may hereinafter appear, my invention consists in the elements and their relation one to the other as hereinafter particularly described and sought to be defined in the claims, reference being had to the accompanying drawings forming a part thereof, and in which:

Fig. 1 is an elevational view with parts shown in section and other parts broken away, of the indication selector of my invention, Fig. 2 is a plan view thereof, Fig. 3 is a right-side elevational view thereof, Fig. 4 is a left-side elevational view thereof, Fig. 5 is a view taken in cross-section on the line 5—5, Fig. 1, and Fig. 6 is a diagrammatic view showing the arrangement of parts of the selector and the manner of connecting the same in circuit.

Referring now more in detail to the drawings, and more particularly to Fig. 6 thereof, the indication selector of my invention comprises an indication means generally designated as A adapted to be moved from a neutral or inactive position as indicated in the figure to either of a plurality of active positions in the directions as indicated by the arrows in Fig. 6, and electrical means generally designated as B selectively energizable by a circuit, which for convenience is designated as $a$, for moving the indication means A, and a magnetic clutch or holding means C for holding the indication means A in either of its active positions when moved to either of such positions by the electrical means B, the said clutch means preferably comprising an electro-magnetic mechanism energizable by means of a circuit generally designated as $b$.

The electrical means B may consist of a motor mechanism which in the preferred construction includes a preferably permanent field magnet $b'$ and an armature winding $b^2$ cooperating therewith, the said winding normally assuming a neutral or inactive position as shown in Fig. 6 and movable clockwise or counter-clockwise to either of two active positions, depending upon the characteristic of the current flowing through the circuit $a$ connected thereto. The indication means A is preferably mounted on the shaft of the armature winding $b^2$ as diagrammatically indicated in the figure, and as will be detailed further hereinafter, so that the indication means is movable into positions corresponding to the positions of the armature for producing any one of a number of different train indications. The motor means B is intended to be intermittently operated in the movement of the train over a roadbed, and to this end the circuit $a$ comprises a vehicle partial circuit connected at its opposite ends to a shoe $s$ and to the framework of the vehicle designated by the ground connection $g$, this partial circuit being intended to be closed by a roadside partial circuit (not shown) when the shoe $s$ moves over a roadside ramp. The roadside partial circuit may be of the type as disclosed for example in the copending application of Archibald G. Shaver, Serial No. 292,548, filed May 25, 1919. In the operation of the electrical means B, when the shoe $s$ engages and rides over a roadside ramp energized with a given polarity responsive to "clear" track conditions, the armature $b^2$ is energized and rotated in one direction; and when the shoe $s$ engages a ramp having an opposite polarity, as under "caution" roadside conditions, the armature $b^2$ is rotated in the opposite direction; and when the shoe $s$ engages a non-energized ramp, as under "danger" track conditions, the armature $b^2$ assumes or holds its neutral position as shown. This action being intermittent, the energization of the armature $b^2$ is for a limited period of time only, corresponding to the period during which the shoe $s$ is in contact with the roadside ramp, the energization ceasing when the shoe leaves the ramp.

For holding the armature $b^2$ and the indication means A in either of its active positions after the shoe leaves a "clear" or "caution" ramp, the magnetic clutch means C hereinbefore referred to is provided. As heretofore mentioned, one of the principal objects of the invention comprehends the provision of a magnetic clutch means which is substantially inertialess in its operation, and which is constructed to be instantly operable to perform its holding function after the indication means has been moved to an active position; and to this end the clutch means comprises a magnet $c'$ and an armature $c^2$, the said armature being connected to and for movement with the indication selector A, and as diagrammatically shown in Fig. 6, the armature is preferably attached to the shaft carrying the indication selector, and is movable therewith into an intermediate or neutral position shown and into either of two active positions for cooperation with the poles $p$, $p'$ of the magnet $c'$. The magnet $c'$ preferably comprises an electromagnet having the winding $c^3$ energizable by means of the circuit $b$, the said circuit being normally closed by the contact means $c^4$ when the shoe $s$ is in a descended position, and being opened when the shoe $s$ is elevated by engagement with the ramp. With this construction, it will be seen that when a shoe engages an energized roadside ramp, the armature $b^2$ will be moved to an active position, thereby moving the armature $c^2$ into a position adjacent either of the poles $p$ or $p'$, the latter armature being free to move by virtue of the deenergization of the winding $c^3$ connected in the then open circuit $b$; and when the shoe leaves the ramp the circuit $b$ will be closed by the contact means $c^4$, energizing the poles of a magnetic clutch for holding the armature in an active position. It is to be noted, since the armature $c^2$ is moved to its position adjacent a pole of the magnetic clutch by the operation of the motor means B, that the magnet C is instantly operative for performing its holding function as soon as the circuit $b$ is closed by the descending movement of the shoe $s$.

For the purpose of holding the armature winding $b^2$ and the indication means A in neutral or inactive position under "danger" traffic conditions, I preferably provide a locking means generally designated as D, which preferably includes a member $d'$, connected to and for movement with the indication means A, a pivoted dog $d^2$ for engaging and locking the member $d'$ in its neutral position as shown in Fig. 6, and an electromagnetic means $d^3$ operative on the dog $d^2$ for moving the same into an unlocking position, the said electromagnetic means $d^3$ being arranged in series with the armature $b^2$ in the circuit $a$, so that when current of either polarity is sent through the circuit, the locking dog $d^2$ will be moved to an inactive position to permit the rotation of the armature $b^2$ and its connected parts to either of its active positions.

Referring now to Figs. 1 to 5 of the drawings, which show the constructional details of the indication selector, the motor means B is shown to comprise the preferably horse shoe-shaped spaced permanent magnets $b'$ provided with the oppositely arranged pole pieces 10 and 11 attached to the magnets by means of the securing elements 12, between which pole pieces moves the armature $b^2$ which may comprise a central core member 13 carrying the oppositely positioned pole pieces 14 and 15 and the winding 16, the core member also carrying the end plates 17 and 18 which are provided with the stub shafts 19 and 20 respectively, these shafts rotating in ball bearings 21 and 22 respectively journalled in the end bracket plates 23 and 24 respectively.

For the purpose of causing the armature to assume its neutral position shown, I provide magnetic means which preferably comprises cooperating pole sections on the field and armature pole pieces cooperating to provide a magnetic path of least reluctance when the armature is in its neutral position. This is shown, for example, in Figs. 1 to 5 of the drawings, the pole pieces 14 and 15 of the armature being provided with raised terminal pole sections 25, 26, 27 and 28 cooperating with the terminal portions of the pole pieces 10 and 11, the construction being such that the armature will have a tendency to place itself in the position as represented between the two pole pieces of the field magnet because of the minimum reluctance which it offers to the magnetic flux between the pole pieces when in this position, the construction being furthermore such that the torque produced by a current energizing the winding 16 can turn the armature in either direction because of the uniform shallowness of the surfaces intermediate the raised portions 25 to 28.

The parts of the magnetic clutch or holding means C may all be conveniently carried by the end bracket plate 24, the clutch means constructionally comprising the two similar iron pieces 29 and 30 joined together so as to hold between them on a core 31 the magnetizing coil $c^3$, these parts being carried by the extension 32 which may preferably be formed integrally with the end bracket plate 24. The iron pieces 29 and 30 may each provide a plurality of at least two pole pieces such as $p$ and $p'$, between which is movable a soft iron piece 33 attached to a flat spring 34 carried by a tail piece 35, the said tail piece being fixed to a reduced portion of the stub shaft 20, as is clearly shown in Figs. 1, 2 and 3 of the drawings, the elements 33, 34 and 35 collectively comprising the armature $c^2$ heretofore mentioned. For limiting the movement of the armatures in either of its active positions, I may provide the oppositely positioned set screws 36 and 37 adjustable in the apertured lugs 38 and 39 which may be formed integrally with the plate 24, the said screws cooperating with the tail piece 35 to stop or limit the movement of the same in either direction.

The parts of the neutral locking means D are preferably supported on the bracket plate 23, the electromagnet $d^3$ being supported on a bracket 40 which may be formed integrally with the plate 23, the dog $d^2$ being journalled in the yoke member 41 which may also be formed integrally with the plate 23. The electromagnet $d^3$ comprises preferably a plurality of coils 42 each carried by a core member 43 secured at its lower end to the bracket 40 by means of the securing element 44 and terminating at its upper end in a pole piece 45; and cooperating with the pole pieces there is provided an armature 46 fixed to the dog $d^2$. The member $d'$ of the locking means is preferably carried by and fixed to the armature stub shaft 19, and the said member is notched at its upper end, as at 47, for receiving the end of the dog $d^2$ in locking position.

For the purpose of securing an effective locking of the member $d'$ in the neutral position as shown in the drawings, I preferably provide magnetic means for holding the member $d'$ in neutral position, and to this end the member $d'$ comprises a hardened tool steel member which has been magnetized lengthwise for cooperation with another magnetized member 48 attached to the underneath side of the dog $d^2$, these parts being magnetized so that opposite polarities of the members $d'$ and 48 will be adjacent. With this construction there will thus be a permanent moment of force exerted by the magnetized member $d'$ on the dog $d^2$, causing these parts to effectively interlock in the absence of energization of the electromagnet $d^3$. When the electromagnetic means $d^3$ is energized, the dog $d^2$ will be moved to unlocking position against the action of the magnetic locking means, and the parts of the selector are thus rendered free to move. With this construction, I am enabled to provide a balanced neutral lock for the armature, with the elimination of all resilient means urging the parts to position.

While I have shown my invention in the preferred form, it will be obvious that many changes and modifications may be made in the structure disclosed without departing from the spirit of the invention, defined in the following claims.

I claim:

1. An indication selector for train control systems, comprising an indication means movable into either of two active positions, electrical means energizable in response to traffic conditions for moving the said indication means selectively into either of such positions, and mechanism for holding the said indication means in either of such positions, said mechanism including magnet means and an armature cooperating therewith, said armature being connected to and for movement with said indication means.

2. An indication selector for train control systems, comprising an indication means movable into either of two active positions, electrical means energizable in response to traffic conditions for moving the said indication means selectively into either of such positions, and mechanism for holding the said indication means in either of such positions, said mechanism including magnet means having at least two spaced poles and means movable with said indication means into position adjacent one or the other of said poles.

3. An indication selector for train control systems, comprising an indication means movable into either of two active positions, electrical means energizable in response to traffic conditions for moving the said indication means selectively into either of such positions, and mechanism for holding the said indication means in either of such positions, said mechanism including an electromagnet and an armature cooperating therewith, said armature being connected to and for movement with said indication means.

4. An indication selector for train control systems, comprising an indication means movable into either of two active positions, electrical means energizable in response to traffic conditions for moving the said indication means selectively into either of such positions, and mechanism for holding the said indication means in either of such positions, said mechanism including an electromagnet having at least two spaced poles and an armature movable into position adjacent one or the other of said poles, said armature being connected to and for movement with said indication means.

5. An indication selector for train control systems, comprising an indication means movable into either of two active positions, electrical means energizable in response to traffic conditions for moving the said indication means selectively into either of such positions, and mechanism for holding the said indication means in either of such positions, said mechanism including magnet means having at least two spaced poles adapted for cooperation with part of said indication means, such part being movable adjacent one or the other of said poles when the indication means is movable to enter one or the other of its active positions.

6. An indication selector for train control systems, comprising a field magnet, an armature therefor movable into either of two active positions in response to traffic conditions, an indication means connected for movement with the said armature, and mechanism for holding the said armature in either of its active positions, said mechanism including a magnet means having at least two spaced poles, and means connected to and for movement with said armature into position adjacent one or the other of said poles.

7. An indication selector for train control systems, comprising a permanent field magnet, a coil armature therefor movable into either of two active positions and energizable in response to traffic conditions, an indication means connected for movement with the said armature, and mechanism for holding the said armature in either of its active positions, said mechanism including a magnet means having at least two spaced poles, and armature means connected to and for movement with said coil armature into position adjacent one or the other of said poles.

8. An indication selector for train control systems, comprising a field magnet, an armature therefor movable into either of two active positions in response to traffic conditions, an indication means connected for movement with the said armature, and mechanism for holding the said armature in either of its active positions, said mechanism including a magnet means and an armature, cooperating therewith connected to and for movement with said first mentioned armature.

9. An indication selector for train control systems, comprising an indication means movable into either of two active positions and into a neutral or inactive position, electrical means energizable in response to traffic conditions for moving the said indication means selectively into either of its active positions, magnetic means active for causing the indication means to assume its neutral position in the absence of energization of said electrical means, and magnetic mechanism for holding the said indication means in either of its active positions.

10. An indication selector for train control systems, comprising an indication means movable into either of two active positions and into a neutral or inactive position, electrical means energizable in response to traffic conditions for moving the said indication means selectively into either of its active positions, magnetic means active for causing the indication means to assume its neutral position in the absence of energization of said electrical means, and magnetic mechanism for holding the said indication means in either of its active positions, the said magnetic mechanism including a magnet having at least two spaced poles and means movable with said indication means into position adjacent one or the other of said poles.

11. An indication selector for train control systems, comprising an indication means movable into either of two active positions and into a neutral or inactive position, electrical means energizable in response to traffic conditions for moving the said indication means selectively into either of its active positions, magnetic means active for causing the indication means to assume its neutral position in the absence of energization of said electrical means, and mechanism for holding the said indication means in either of its active positions, said mechanism including magnet means having at least two spaced poles adapted for cooperation with part of said indication means, such part being movable adjacent one or the other of said poles when the indication means is movable to enter one or the other of its active positions.

12. An indication selector for train control systems, comprising a field magnet, an armature therefor movable into either of two active positions and into a neutral or inactive position, the said field magnet and armature being provided with cooperating pole sections active for causing the armature to normally assume its neutral position, and magnetic mechanism for holding the said armature in either of its active positions.

13. An indication selector for train control systems, comprising a field magnet, an armature therefor movable into either of two active positions and into a neutral or inactive position, the said field magnet and armature being provided with cooperating pole sections active for causing the armature to normally assume its neutral position, an indication means connected for movement with said armature, and mechanism for holding the said armature in either of its active positions, said mechanism including magnet means having at least two spaced poles and means movable with said indication means into position adjacent one or the other of said poles.

14. An indication selector for train control systems, comprising an indication means movable into either of two active positions and into a neutral or inactive position, electrical means energizable in response to traffic conditions for moving the said indication means selectively into either of its active positions, and magnetic means active for causing the indication means to assume its neutral position in the absence of energization of said electrical means.

15. An indication selector for train control systems, comprising an indication means movable into either of two active positions and into a neutral or inactive position, electrical means energizable in response to traffic conditions for moving the said indication means selectively into either of its active positions, magnetic means for holding the said indication means in either of such active positions, and a locking means for holding the indication means in its neutral position.

16. An indication selector for train control systems, comprising an indication means movable into either of two active positions and into a neutral or inactive position, electrical means energizable in response to traffic conditions for moving the said indication means selectively into either of its active positions, means including a magnet and an armature therefor attached to and for movement with said indication means for holding the said indication means in either of such active positions, and a locking means for holding the indication means in its neutral position.

17. An indication selector for train control systems, comprising an indication means movable into either of two active positions and into a neutral or inactive position, a field magnet and an armature energizable in response to traffic conditions for moving the said indication means selectively into either of its active positions, electromagnetic means for holding the said indication means in either of such active positions, and an electromagnetic locking means for holding the indication means in its neutral position.

18. An indication selector for train control systems, comprising an indication means movable into either of two active positions and into a neutral or inactive position, electrical means energizable in response to traffic conditions for moving the said indication means selectively into either of its active positions, magnetic means for holding the said indication means in either of such active positions, and a magnetic locking means for holding the indication means in its neutral position movable to unlocking position upon energization of the said electrical means.

19. An indication selector for train control systems, comprising an indication means movable into either of two active positions and into a neutral or inactive position, a field magnet and an armature energizable in response to traffic conditions for moving the said indication means selectively into either of its active positions, electromagnetic means for holding the said indication means in either of such active positions, a magnetic locking means for holding the indication means in its neutral position, and an electromagnet for moving the locking means to unlocking position upon energization of the said field magnet and armature.

20. An indication selector for train control systems, comprising an indication means movable into an active position and into a neutral or inactive position, electrical means energizable in response to traffic conditions for moving said indication means into its active position, magnetic locking means for holding the said indication means in its neutral position in the absence of energization of the electrical means, and an electromagnet for moving the locking means to unlocking position upon energization of the electrical means.

21. An indication selector for train control systems, comprising an indication means movable into an active position and into a neutral or inactive position, a permanent field magnet and an armature winding energizable in response to traffic conditions for moving said indication means into its active position, magnetic locking means for holding the said indication means in its neutral position in the absence of energization of the armature winding, and an electromagnet for moving the locking means to unlocking position upon energization of the electrical means.

22. An indication selector for train control systems, comprising a field magnet, an armature therefor movable into either of two active positions and into a neutral or inactive position, the said field magnet and armature being provided with cooperating pole sections active for causing the armature to normally assume its neutral position.

Signed at Niagara Falls, in the county of Niagara and State of New York, this 6th day of April, A. D. 1923.

THEODORE BODDE.